United States Patent
Okawa et al.

(10) Patent No.: US 7,438,062 B2
(45) Date of Patent: Oct. 21, 2008

(54) FLOW PASSAGE SWITCHING VALVE

(75) Inventors: Akira Okawa, Obu (JP); Masahiro Ishikawa, Obu (JP)

(73) Assignee: Aisan Kogyo Kabushiki Kaisha, Obu-shi (JP)

( * ) Notice: Subject to any disclaimer, the term of this patent is extended or adjusted under 35 U.S.C. 154(b) by 112 days.

(21) Appl. No.: 11/524,735

(22) Filed: Sep. 22, 2006

(65) Prior Publication Data

US 2007/0084448 A1 Apr. 19, 2007

(30) Foreign Application Priority Data

Oct. 3, 2005 (JP) ............................. 2005-290096

(51) Int. Cl.
*F02M 25/07* (2006.01)
*F02B 47/08* (2006.01)
*F28F 27/02* (2006.01)

(52) U.S. Cl. ................... 123/568.12; 165/103
(58) Field of Classification Search ............. 123/568.11, 123/568.12, 568.2, 568.21; 60/605.2; 165/103
See application file for complete search history.

(56) References Cited

U.S. PATENT DOCUMENTS

| 4,134,377 | A | * | 1/1979 | Bamsey et al. | 123/568.12 |
| 6,718,956 | B2 | * | 4/2004 | Klipfel et al. | 123/568.12 |
| 6,786,210 | B2 | * | 9/2004 | Kennedy et al. | 123/568.12 |
| 6,868,840 | B2 | * | 3/2005 | Lewallen | 123/568.12 |
| 6,971,377 | B2 | * | 12/2005 | Moyer et al. | 123/568.12 |
| 7,032,577 | B2 | * | 4/2006 | Rosin et al. | 123/568.12 |
| 7,077,114 | B2 | * | 7/2006 | Hüsges | 123/568.12 |

FOREIGN PATENT DOCUMENTS

JP A 10-121996 5/1998

\* cited by examiner

*Primary Examiner*—Willis R Wolfe, Jr.
(74) *Attorney, Agent, or Firm*—Oliff & Berridge, PLC

(57) ABSTRACT

A flow passage switching valve provided with a swing arm type valve element comprises a housing formed with a first passage communicated with an inlet port, a second passage communicated with an outlet port, a bypass passage for providing communication between the first passage and the second passage, an introduction port through which a fluid flowing in the first passage is introduced into an external part, and a discharge port through which the fluid introduced into the external part is discharged into the second passage.

15 Claims, 10 Drawing Sheets

FLOW PASSAGE SWITCHING VALVE

BACKGROUND OF THE INVENTION

1. Field of the Invention

The present invention relates to a flow passage switching valve for switching a flow passage of a fluid and, more particularly, to a flow passage switching valve provided with a valve element of a swing arm type.

2. Description of Related Art

For diesel engines, an exhaust gas recirculation (EGR) system has been adopted heretofore to reduce NOx in exhaust gas. When high-temperature exhaust gas is directly recirculated to an intake side of this EGR system, the high-temperature, expanded exhaust gas is supplied to an intake manifold. This increases the ratio of exhaust gas in a cylinder. Accordingly, the amount of air in the cylinder decreases, leading to lowering of combustion efficiency and also deterioration of exhaust gas components such as NOx.

To avoid the above problems, an EGR-cooler-attached EGR system has been developed. This system is structured such that an EGR cooler for cooling exhaust gas (EGR gas) by heat exchange with cooling water is disposed in part of an EGR passage to cool high-temperature exhaust gas (EGR gas), and the thus cooled gas is recirculated to an intake manifold. When the temperature of cooling water is low at engine start or at cold temperatures, on the other hand, exhaust gas (EGR gas) is likely to be excessively cooled, which causes lowering of combustion efficiency in a cylinder and deterioration of exhaust gas components. Accordingly, at engine start or cold temperatures at which the temperature of cooling water is lower than usual, the above EGR-cooler-attached EGR system is structured to allow exhaust gas (EGR gas) to flow in a bypass passage connected thereto to bypass the passage of the EGR cooler.

Further, a flow passage switching valve has been used to switch the flow of exhaust gas from one direction to either one of two directions or from two directions to one direction in order to switch the EGR cooler between use or nonuse. As such flow passage switching valve, many valves using butterfly valve elements have been put to practical use.

This flow switching valve using the butterfly valve element is however difficult to provide high dimensional accuracy, which may cause accumulation of deposits, leading to fixation of the valve element or interference to movement of the valve element to a full closed position.

Under the circumstances, using a flow passage switching valve provided with a valve element of a swing arm type in the EGR system has been proposed. One of the flow passage switching valves using such swing arm type valve element is a three-way switching valve with a rotatable cantilevered valve shaft and a flat valve seat to cause a valve element to come into surface contact with the valve seat, thereby improving the closability of fluid.

If used in the EGR-cooler-attached EGR system, however, even the above flow passage switching valve using the swing arm type valve element needs a pipe for EGR cooler and a bypass pipe to bypass the EGR cooler. This makes it difficult to reduce a mounting space of the system in an engine room.

Further, the above flow passage switching valve using the swing arm type valve element is likely to cause stagnation of exhaust gas around a support shaft (a bearing) due to a positional relationship between a path in each direction and the support shaft (the bearing). This also likely causes accumulation of deposits or stagnation of condensed water around the support shaft (the bearing). There is also a problem that the accumulation of deposits and stagnation of condensed water may increase resistance of operation of the valve element.

BRIEF SUMMARY OF THE INVENTION

The present invention has been made in view of the above circumstances and has an object to provide a flow passage switching valve capable of simplifying a system in which the flow passage switching valve is to be used and preventing accumulation of products derived from exhaust gas on or around a bearing.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a flow passage switching valve comprising: a housing formed with an inlet port through which a fluid discharged from an engine flows in the housing and an outlet port through which the fluid flows out of the housing; a valve element of a swing arm type for allowing and interrupting communication between the inlet port and the outlet port to switch a flow passage; a valve shaft fixed to the swing arm type valve element; a bearing which rotatably supports the valve shaft; and an actuator for rotating the valve shaft to swing the swing arm type valve element; wherein the housing is formed with: a first passage communicated with the inlet port; a second passage communicated with the outlet port; a bypass passage which provides communication between the first passage and the second passage; an introduction port through which the fluid having flowed in the first passage is introduced into an external part attachable to the flow passage switching valve; and a discharge port through which the fluid introduced into the external part is discharged into the second passage.

Further, according to another aspect, the present invention provides a flow passage switching valve comprising: a housing formed with an inlet port through which a fluid discharged from an engine flows in the housing and an outlet port through which the fluid flows out of the housing; a valve element of a swing arm type for allowing and interrupting communication between the inlet port and the outlet port to switch a flow passage; a valve shaft fixed to the swing arm type valve element; a bearing which rotatably supports the valve shaft; and an actuator for rotating the valve shaft to swing the swing arm type valve element; wherein the housing is formed with: a first passage communicated with the inlet port; a second passage communicated with the outlet port; a bypass passage which provides communication between the first passage and the second passage; an introduction port through which the fluid having flowed in the first passage is introduced into an external part attachable to the flow passage switching valve; a discharge port through which the fluid introduced into the external part is discharged into the second passage; the bypass passage is vertically formed; and the valve element is placed in the first passage.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of a preferred embodiment of the present invention will now be given referring to the accompanying drawings. In the present embodiment, the flow passage switching valve of the present invention will be explained as an EGR cooler bypass valve used in an EGR-cooler-attached EGR system.

Figure 1:
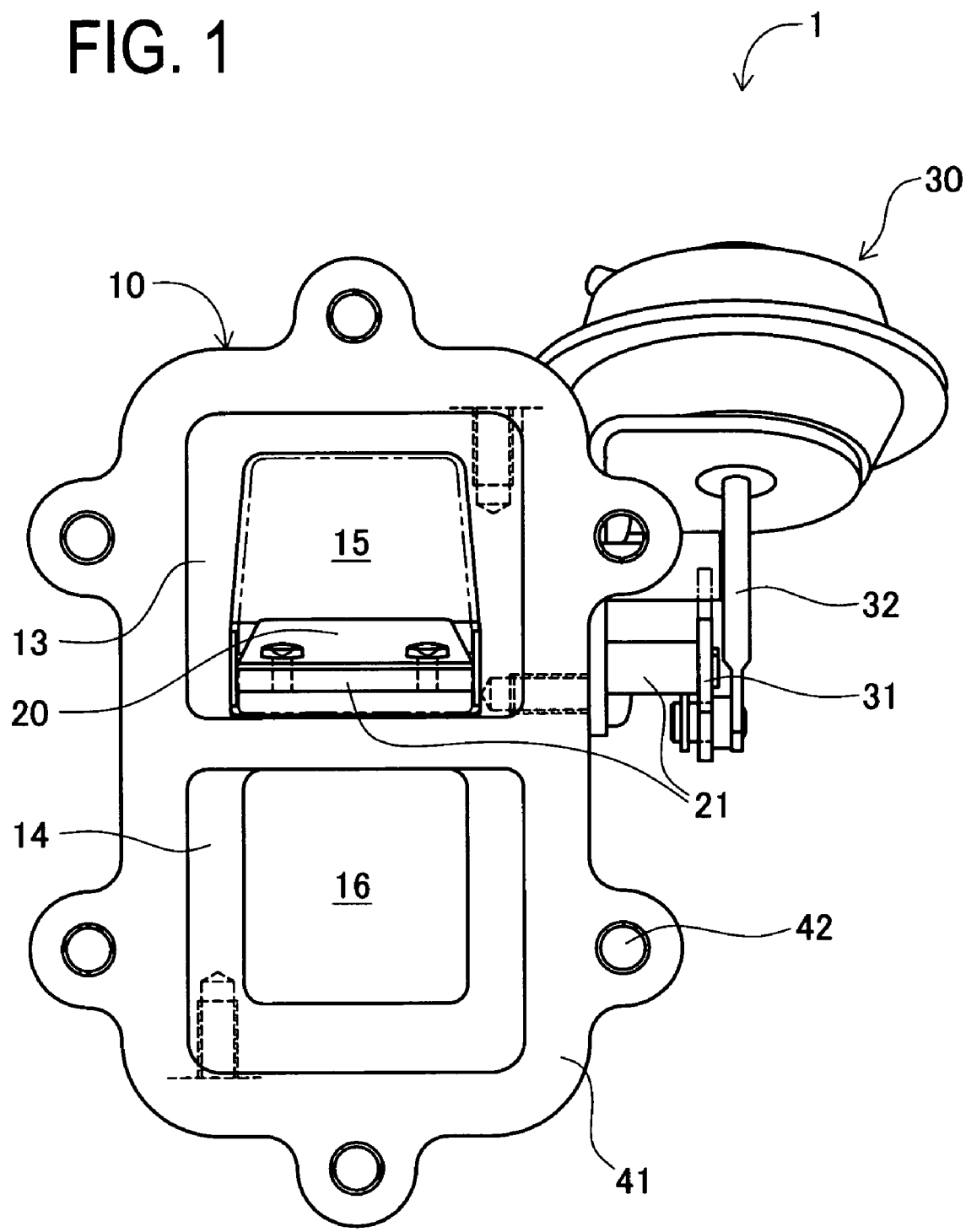
FIG. 1 is a front view of an EGR cooler bypass valve in a preferred embodiment.
Figure 2:
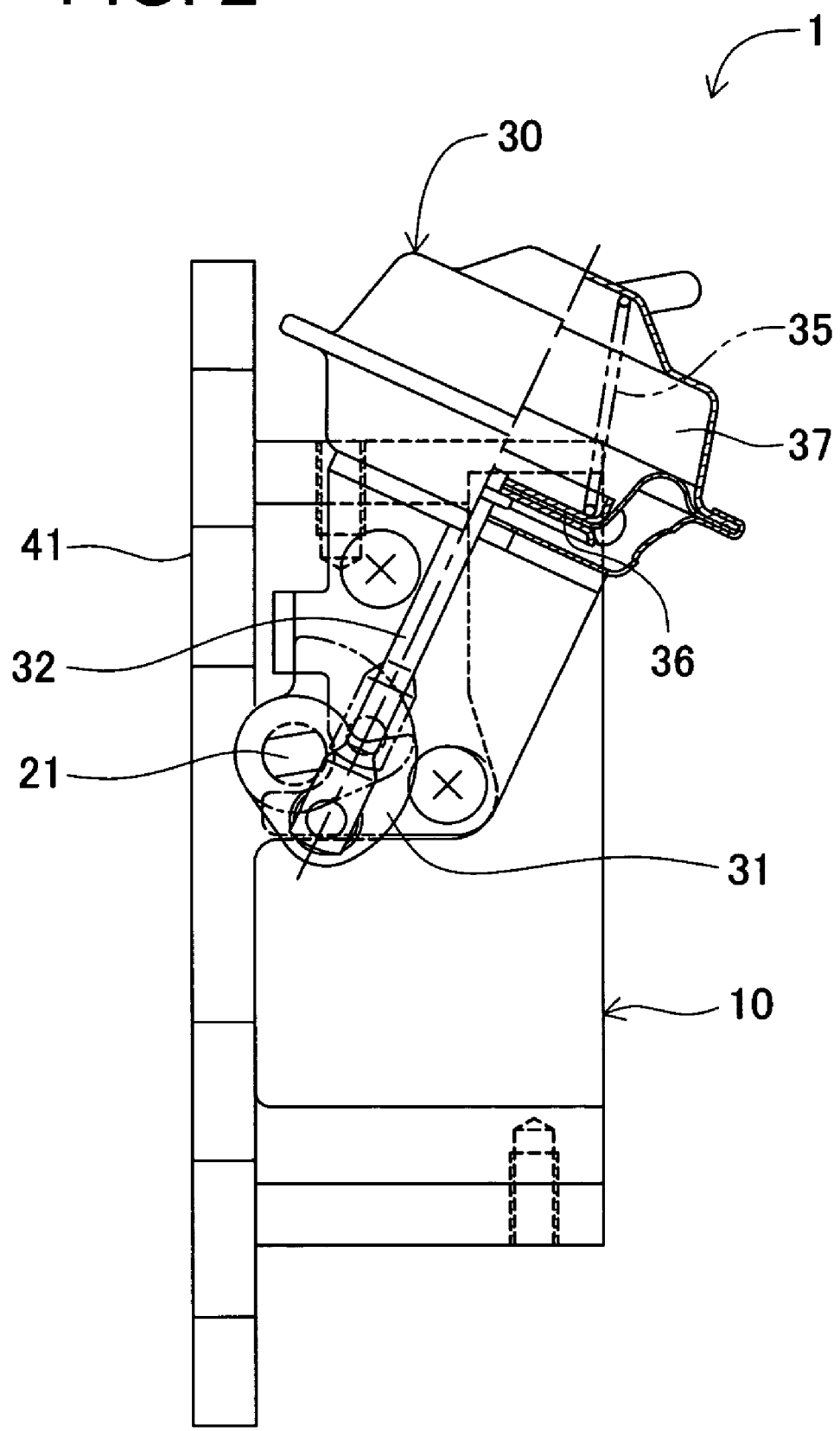
FIG. 2 is a side view of the EGR cooler bypass valve of FIG. 1.
Figure 3:
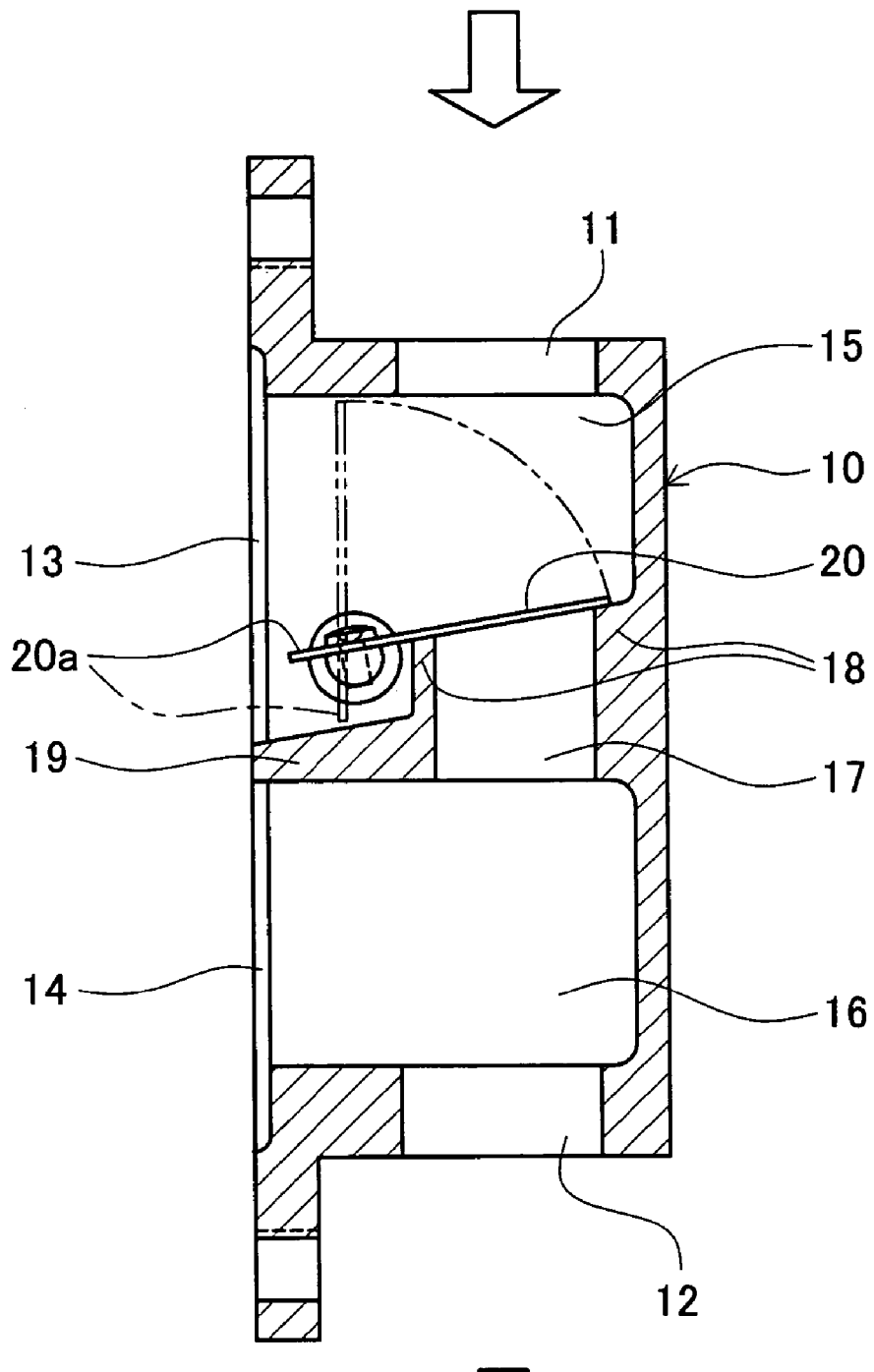
FIG. 3 is a sectional view of the EGR cooler bypass valve of FIG. 1.
Figure 4:
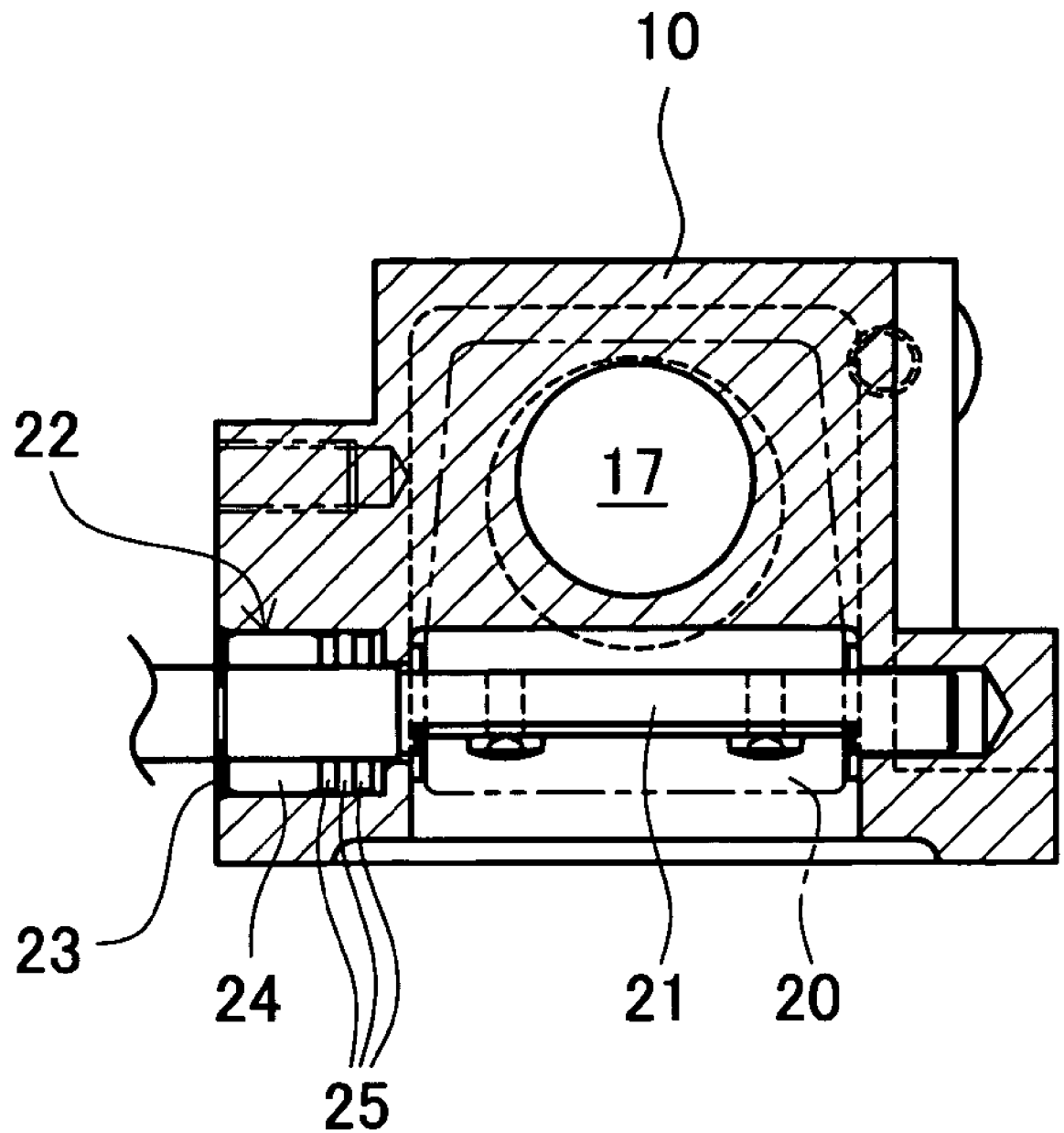
FIG. 4 is a cross-sectional view of the EGR cooler bypass valve, showing a schematic structure of a bearing and peripheral parts thereof.

The EGR cooler bypass valve in the present embodiment is described below referring to FIGS. 1 to 4. FIG. 1 is a front view of the EGR cooler bypass valve in the present embodiment; FIG. 2 is a side view of the EGR cooler bypass valve of FIG. 1; FIG. 3 is a sectional view of the EGR cooler bypass valve of FIG. 1; and FIG. 4 is a cross-sectional view of the EGR cooler bypass valve of FIG. 1, showing a schematic structure of a bearing and peripheral parts thereof.

The EGR cooler bypass valve 1 includes a housing 10 in which flow passages are formed, a swing valve 20 for switching between the passages formed in the housing 10, a valve shaft 21 to which the swing valve 20 is fixed, and an actuator 30 for rotating the valve shaft 21 to actuate (swing) the swing valve 20.

The housing 10 is made of aluminum, formed in nearly rectangular parallelepiped shape. This housing 10 is formed with an inlet port 11 through which EGR gas flows in the housing 10, an outlet port 12 through which EGR gas (or EGR cooled gas) flows out of the housing 10, an introduction port 13 through which the EGR gas is introduced into the EGR cooler, and a discharge port 14 through which the EGR cooled gas having passed through the EGR cooler is discharged from the EGR cooler. The inlet port 11 is formed opening in the top of the housing 10 and the outlet port 12 is formed opening in the bottom of the housing 10. The introduction port 13 and the discharge port 14 are formed opening in the side of the housing 10.

Formed in the housing 10 are a first passage 15 providing communication between the inlet port 11 and the introduction port 13, a second passage 16 providing communication between the outlet port 12 and the discharge port 14, and a bypass passage 17 providing communication between the first passage 15 and the second passage 16. On the other hand, a partition wall 19 is formed between the first passage 15 and the second passage 16 to have a slanting surface defining the first passage 15, so that the thickness of the partition wall 19 is reduced toward the introduction port 13.

Herein, the bypass passage 17 is vertically formed so that the inlet port 11, the outlet port 12, and the bypass passage 17 are linearly arranged (i.e. linearly communicated with each other). The housing 10 is further provided with an attaching part 41 for attaching thereto the EGR cooler. This attaching part 41 is formed with six screw holes 42 (corresponding to a "fastening portion" of the present invention), whereby directly attaching the EGR cooler to the EGR cooler bypass valve 1.

The swing valve 20 is placed in the first passage 15 and fixed at an end portion to the valve shaft 21 arranged to be horizontal when the valve 1 is mounted in an engine room, that is, horizontal in FIG. 1. To be more specific, the swing valve 20 is fixed to the valve shaft 21 with an end portion 20a of the swing valve 20 protruding from the valve shaft 21, so that the valve shaft 21 is positioned closer to the partition wall 19 than the swing valve 20 is while the bypass passage 17 is closed. In other words, the valve shaft 21 is positioned under the lower surface of the swing valve 20 in the present invention, and a clearance between the end portion 20a of the swing valve 20 and the partition wall 19 is slight while the introduction port 13 is closed. The swing valve 20 and the valve shaft 21 are made of materials (stainless steel in the present embodiment) harder than the material of the housing 10. These swing valve 20 and valve shaft 21 are applied with oil repellent coating to prevent adhesion of deposits.

The valve shaft 21 is supported in the housing 10 by means of a bearing 22 as shown in FIG. 4. This bearing 22 includes a bush 24 and three seal plates 25 to rotatably support the valve shaft 21. At one end of the bearing 22, an E-ring 23 is fitted on the valve shaft 21. This E-ring 23 serves to prevent movement (displacement) of the valve shaft 21 in a thrust direction. One end of the valve shaft 21 protrudes outside the housing 10 and is coupled with a link member 31 as shown in FIG. 1. This link member 31 is connected with an end of a rod 32 of the actuator 30.

The actuator 30 is formed with a diaphragm chamber 37 in which a diaphragm 36 is placed and urged downward (in a direction that pushes out the rod 32) by a spring 35 as shown in FIG. 2. The diaphragm 36 is coupled with the rod 32. Such actuator 30 is configured so that when a negative pressure is introduced into the diaphragm chamber 37, the diaphragm 36 is moved upward against the urging force of the spring 35, thereby pulling the rod 32 toward the actuator side (to move upward).

With this structure, when the actuator 30 start operating (i.e. when a negative pressure is introduced into the diaphragm chamber 37), the rod 32 is pulled up, rotating the valve shaft 21 through the link member 31. The swing valve 20 fixed to the valve shaft 21 thus swings for opening/closing operations. When the actuator 30 is operated, the swing valve 20 is swung to a position where a clearance between the outer periphery of the swing valve 20 and the inner wall surface of the first passage 15 is very slight, closing the introduction port 13. This slight clearance generated between the outer periphery of the swing valve 20 and the inner wall surface of the first passage 15, which is similarly generated even in a conventionally used butterfly valve, does not cause leakage that may cause a practical problem.

When the actuator 30 is not operated, on the other hand, the swing valve 20 is held in contact with a valve seat 18 formed around an end of the bypass passage 17 on the first passage 15 side, as shown in FIG. 1. This valve seat 18 is formed at a slant with respect to the horizontal direction in FIG. 1 so that a rotation angle of the swing valve 20 is less than 90°. Accordingly, deposits are hard to adhere to the valve seat 18. The valve seat 18 is also formed to receive the swing valve 20 in surface contact relation. Thus, the swing valve 20 can be held in surface contact with the valve seat 18 while the actuator 30 is not operated, thereby closing the bypass passage 17.

Figure 5:
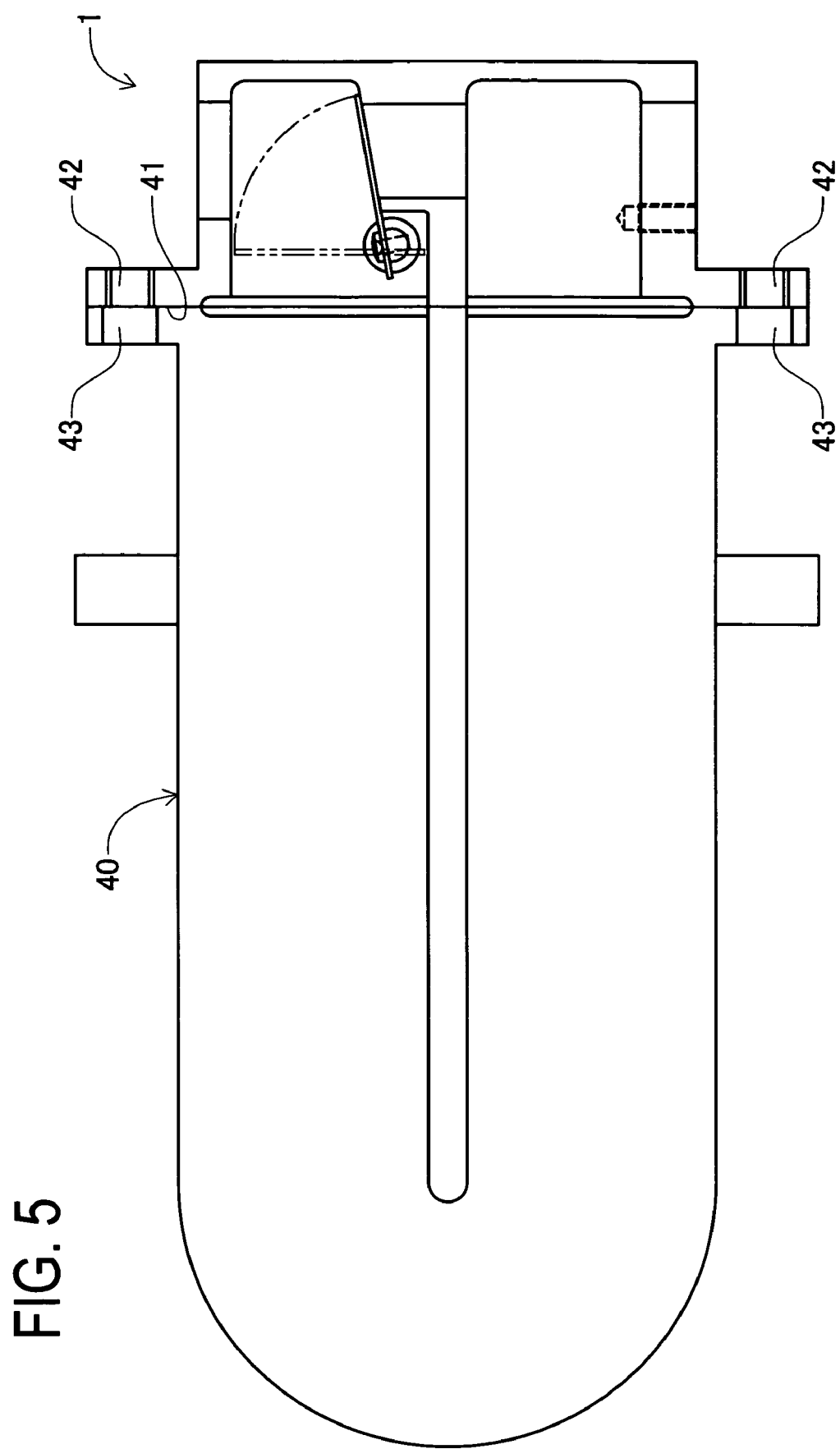
FIG. 5 is an explanatory view showing a configuration that an EGR cooler is attached to the EGR cooler bypass valve.

The above EGR cooler bypass valve 1 is directly attached to an EGR cooler (corresponding to an "external part" of the invention) 40 as shown in FIG. 5. Specifically, the EGR cooler 40 is fastened to the housing 10 by bolts through bolt holes 43 of the EGR cooler 40 aligned with the screw holes 42 of the attaching part 41 of the housing 10. Using the EGR cooler bypass valve 1 can eliminate the need for extra pipes for connection of the EGR cooler 40. FIG. 5 is an explanatory view showing a configuration that the EGR cooler is attached to the EGR cooler bypass valve.

The EGR cooler bypass valve 1, to which the EGR cooler 40 is attached as shown in FIG. 5, is disposed at a predetermined position in an EGR pipe between an exhaust manifold and an intake manifold of an engine. In other words, the inlet port 11 of the EGR cooler bypass valve 1 is connected to the exhaust manifold through the EGR pipe, while the inlet port 12 is connected to the intake manifold through the EGR pipe. In this way, the configuration of the EGR-cooter-attached EGR system using the EGR cooler bypass valve 1 can eliminate the need for pipes for EGR cooler and bypass pipes that have conventionally been required. Thus, the piping configuration of the EGR system can be facilitated. The EGR-cooler-attached EGR system using the EGR cooler bypass valve 1 is therefore extremely easy-to-mount in an engine room.

The operation of the EGR cooler bypass valve 1 having the above structure will be explained below. Firstly, when the cooling water temperature in the engine is a predetermined value or less (i.e. during a cold period), a negative pressure is introduced into the diaphragm chamber 37 of the actuator 30 to operate the actuator 30. Then, the swing valve 20 is swung to open the bypass passage 17 and close the introduction port 13. In the first passage 15, accordingly, the inlet port 11 is brought into communication with the bypass passage 17, closing off communication with the introduction port 13. EGR gas having flowed from the EGR pipe into the first passage 15 of the EGR cooler bypass valve 1 through the inlet port 11 is allowed to pass through the bypass passage 17 into the second passage 16. The EGR gas having flowed in the second passage 16 then flows out of the valve 1 through the outlet port 12 to the intake manifold. As above, during the cold period, the EGR gas is directly supplied to the intake manifold without passing through the EGR cooler 40. At that time, the EGR gas is unlikely to pass through between the valve shaft 21 and the partition wall 19. This is because the clearance between the end portion 20a of the swing valve 20 and the partition wall 19 is sufficiently slight to prevent leakage of EGR gas to the introduction port 13. This makes it possible to prevent accumulation of deposits on or around the valve shaft 21 and the bearing 22.

Since the low-temperature EGR gas flows in the EGR cooler bypass valve 1 during the engine cold period, condensed water is apt to be generated in the first passage 15. In the EGR cooler bypass valve 1, however, the bypass passage 17 is formed vertically so that almost the condensed water generated in the first passage 15 is discharged to the second passage 16 through the bypass passage 17. Further, condensed water that does not flow in the second passage 16 through the bypass passage 17 is discharged along the partition wall 19 out of the valve 1 through the introduction port 13. This is because the partition wall 19 has a slanting surface on the first passage 15 side so that the thickness is gradually reduced toward the introduction port 13. Since the valve shaft 21 is horizontally provided, the condensed water adhering to such valve shaft 21 will drop down by its own weight onto the partition wall 19 without entering the bearing 22. Consequently, the condensed water is unlikely to stagnate in the first passage 15.

Since the swing valve 20 is placed in the first passage 15 in which condensed water is unlikely to stagnate and the valve shaft 21 is horizontally placed, it is surely possible to prevent the condensed water from entering the bearing 22. This makes it possible to reliably prevent corrosion of the housing 10 and hence avoid an increase in operation resistance of the valve shaft 21 resulting therefrom.

In the EGR cooler bypass valve 1, furthermore, the inlet port 11, the bypass passage 17, and the outlet port 12 are linearly arranged. This configuration enables the EGR gas having flowed in the housing 10 through the inlet port 11 to smoothly pass through the bypass passage 17 without stagnating in the first passage 15 and then flow out of the valve 1 through the outlet port 12. It is therefore possible to prevent accumulation of deposits on or around the valve shaft 21 and the bearing 22. In the EGR cooler bypass valve 1, the valve seat 18 is formed at a slant, so that deposits are hard to adhere to the valve seat 18.

In the EGR cooler bypass valve 1, further, the E-ring 23 is fitted on the valve shaft 21 to prevent displacement of the valve shaft 21 (the swing valve 20) in the thrust direction. Accordingly, the introduction port 13 can be closed while a slight clearance is always kept between the outer periphery of the swing valve 20 and the inner surface of the first passage 15 at a slight level. This makes it possible to minimize leakage of EGR gas to the EGR cooler 40.

When the cooling water temperature reaches a predetermined value (after a warm-up period), the introduction of negative pressure into the diaphragm chamber 37 of the actuator 30 is stopped. Then, the swing valve 20 comes into surface contact with the valve seat 18 to close the bypass passage 17 and open the introduction port 13. In the first passage 15, accordingly, the communication between the inlet port 11 and the bypass passage 17 is closed whereas the communication between the inlet port 11 and the introduction port 13 is provided. The EGR gas having flowed from the EGR pipe into the first passage 15 of the EGR cooler bypass valve 1 through the inlet port 11 is supplied to the EGR cooler 40 through the introduction port 13. The EGR gas cooled by the EGR cooler 40 then flows in the second passage 16 through the discharge port 14 and out of the valve 1 through the outlet port 12, and is supplied to the intake manifold. After the warm-up period, as above, the EGR gas cooled by the EGR cooler 40 is supplied to the intake manifold.

Herein, in the EGR cooler bypass valve 1, the swing valve 20 is brought into surface contact with the valve seat 18 to close the bypass passage 17. The bypass passage 17 can therefore reliably be shut off. Even when deposits adhere to the valve seat 18 during the cold period, the deposits just adhered are so soft as to be crushed by the swing valve 20 when brought into surface contact with the valve seat 18 after the warm-up period. This makes it possible to surely prevent leakage of high-temperature EGR gas to the bypass passage 17. In other words, the EGR gas after the warm-up period can be introduced into the EGR cooler 40.

Since the valve seat 18 is formed at a slant, the swing valve 20 in surface contact with the valve seat 18 is also in a slanting position. Accordingly, the EGR gas can smoothly be introduced into the EGR cooler 40 without stagnating in the first passage 15. Because the valve shaft 21 is placed under the swing valve 20, it can prevent the EGR gas from passing to the vicinity of the valve shaft 21 and the bearing 22. It is therefore possible to prevent accumulation of deposits on or around the valve shaft 21 and the bearing 22.

As described above, the EGR cooler bypass valve 1 in the present embodiment includes the housing 10 provided with the first passage 15 communicated with the inlet port 11, the second passage 16 communicated with the outlet port 12, the bypass passage 17 providing communication between the first passage 15 and the second passage 16, the introduction port 13 through which the EGR gas flowing in the first passage 15 is introduced into the EGR cooler 40, the discharge port 14 through which the EGR gas introduced into the EGR cooler 40 is discharged into the second passage 16, and the attaching part 41 with the screw holes 42 whereby the EGR cooler 40 is attached to the valve 1 to connect the passage of the EGR cooler 40 with the introduction port 13 and the discharge port 14. This configuration enables direct attaching of the EGR cooler 40 to the EGR cooler bypass valve 1 without needing extra pipes for EGR cooler. The bypass passage 17 for bypassing the EGR gas so as not to pass through the EGR cooler 40 is further formed in the housing 10, so that no conventional bypass pipe is needed. The EGR cooler bypass valve 1 in the present embodiment as described above does not require any pipes for EGR cooler and any bypass pipes that have conventionally been required. Consequently, the EGR-cooler-attached EGR system can be simplified in structure.

In the EGR cooler bypass valve 1 in the present embodiment, the bypass passage 17 is formed vertically and the swing valve 20 is placed in the first passage 15. During the engine cold period in which condensed water is apt to be generated in the first passage 15, accordingly, the generated condensed water can be discharged to the second passage 16 through the bypass passage 17. For this reason, the condensed water is unlikely to stagnate in the first passage 15 in which the swing valve 20 is placed, which makes it possible to reliably prevent the condensed water from entering the bearing 22. This can avoid corrosion of the housing 10 around the bearing 22, whereby reliably preventing an increase in operation resistance of the valve shaft 21.

The present invention may be embodied in other specific forms without departing from the essential characteristics thereof.

Figure 7:
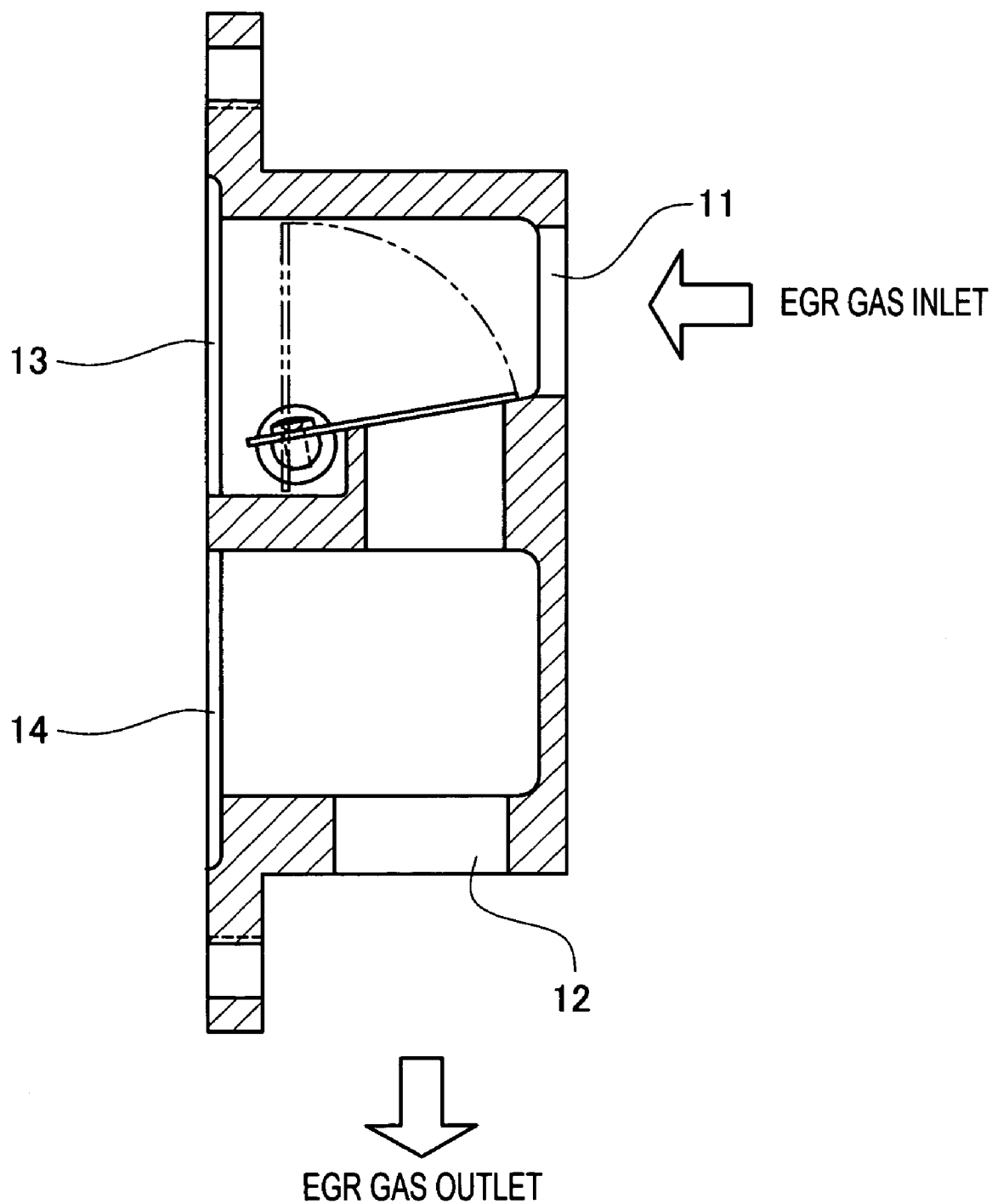
FIG. 7 is a view of another modified example in relation to positions of an inlet port and an outlet port.
Figure 8:
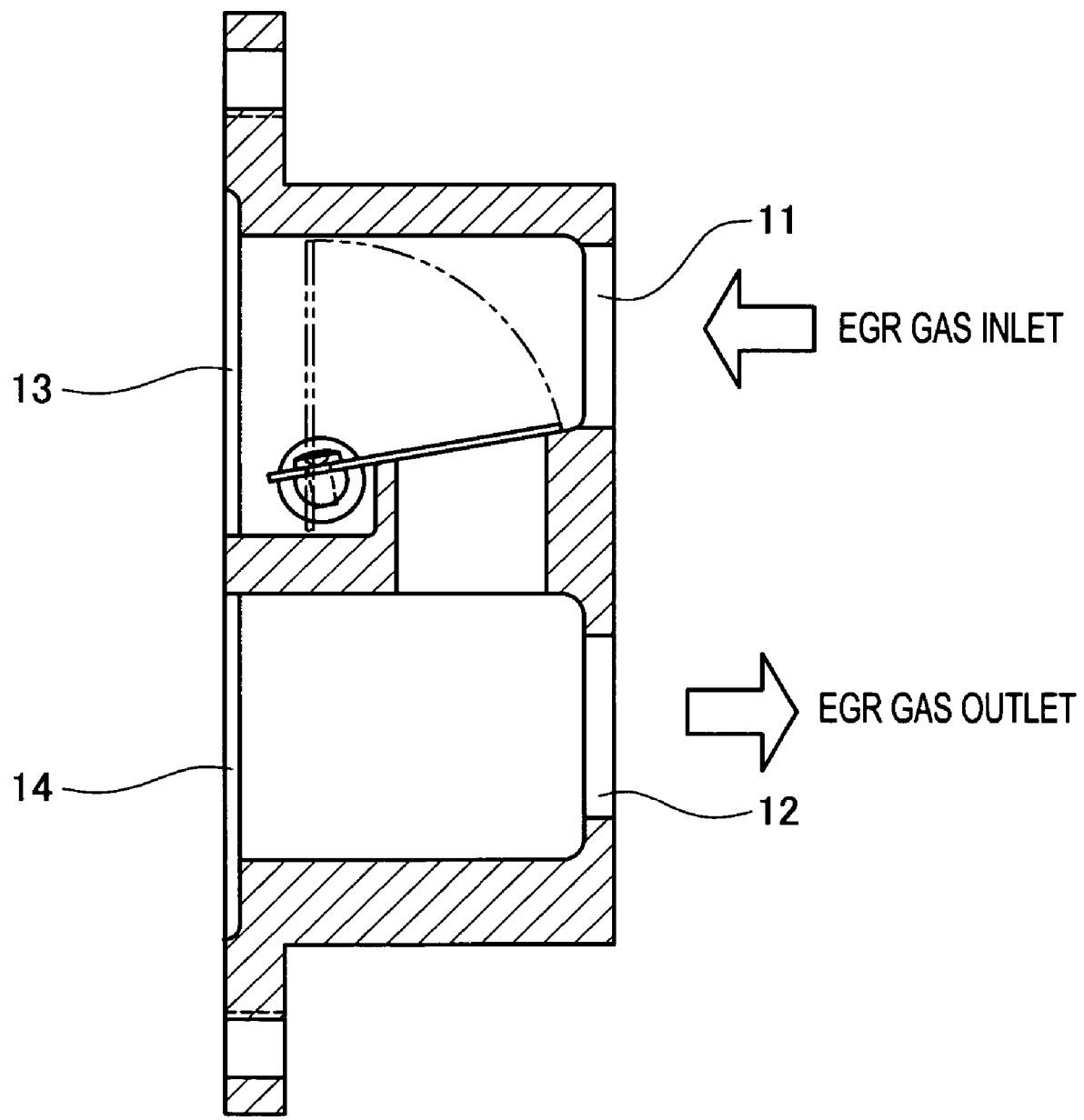
FIG. 8 is a view of another modified example in relation to positions of an inlet port and an outlet port.

For instance, the inlet port 11, the bypass passage 17, and the outlet port 12 are arranged linearly in the above embodiment. If this arrangement causes difficulty in mounting the valve 1 in the engine room, different arrangements may be adopted as shown in FIGS. 6 to 8.

Figure 6:
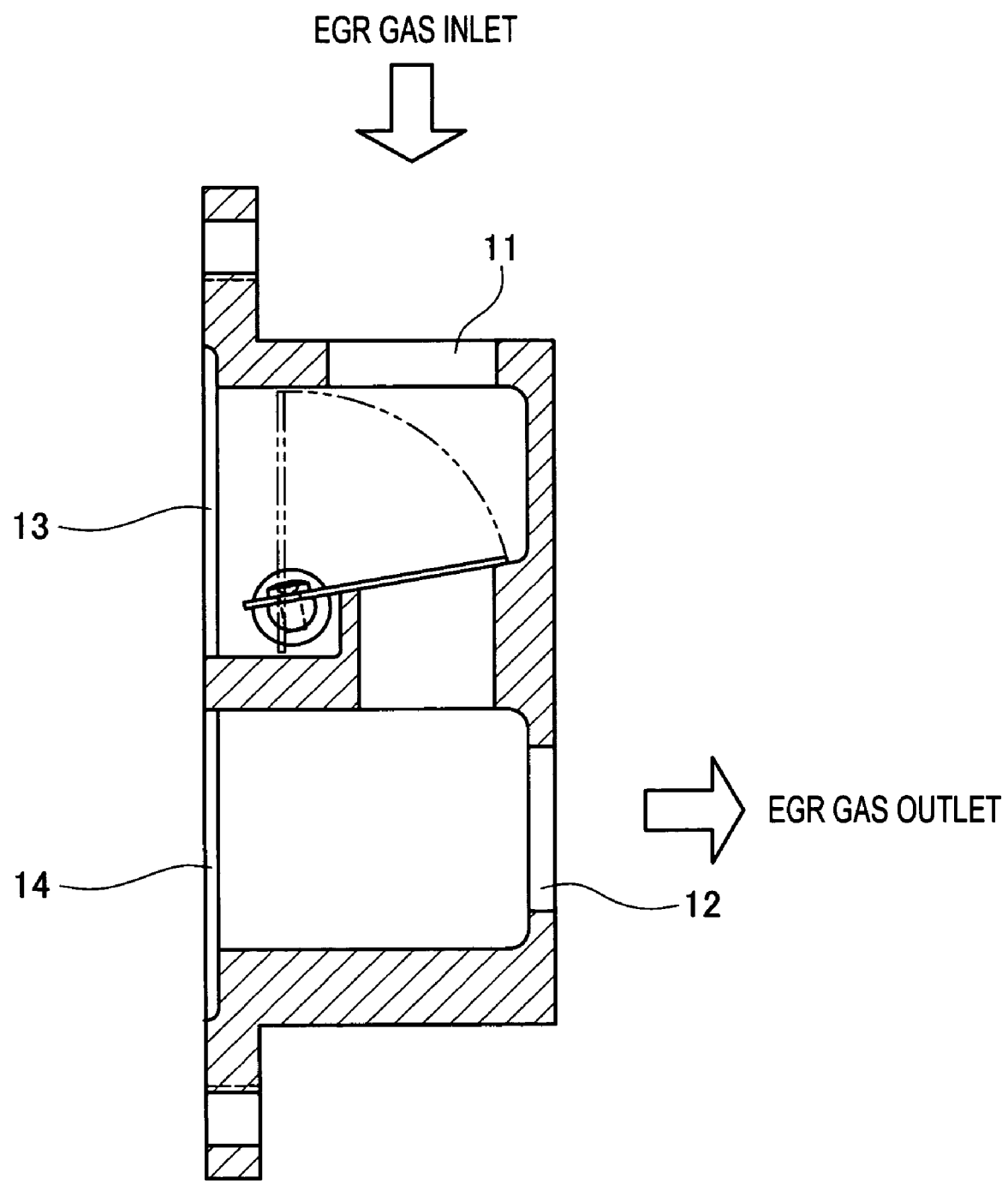
FIG. 6 is a view of a modified example in relation to positions of an inlet port and an outlet port.

Specifically, as shown in FIG. 6, the position of the inlet port 11 remains unchanged (in the top of the housing) but the outlet port 12 is formed in the side wall of the housing, opposing the discharge port 14. As another alternative, as shown in FIG. 7, the position of the outlet port 12 remains unchanged (in the bottom of the housing) but the inlet port 11 is formed in the side wall of the housing, opposing the introduction port 13. Further, as another alternative, as shown in FIG. 8, the inlet port 11 is formed in the side wall of the housing, opposing the introduction port 13 and the outlet port 12 is formed in the housing, opposing the discharge port 14.

Figure 9:
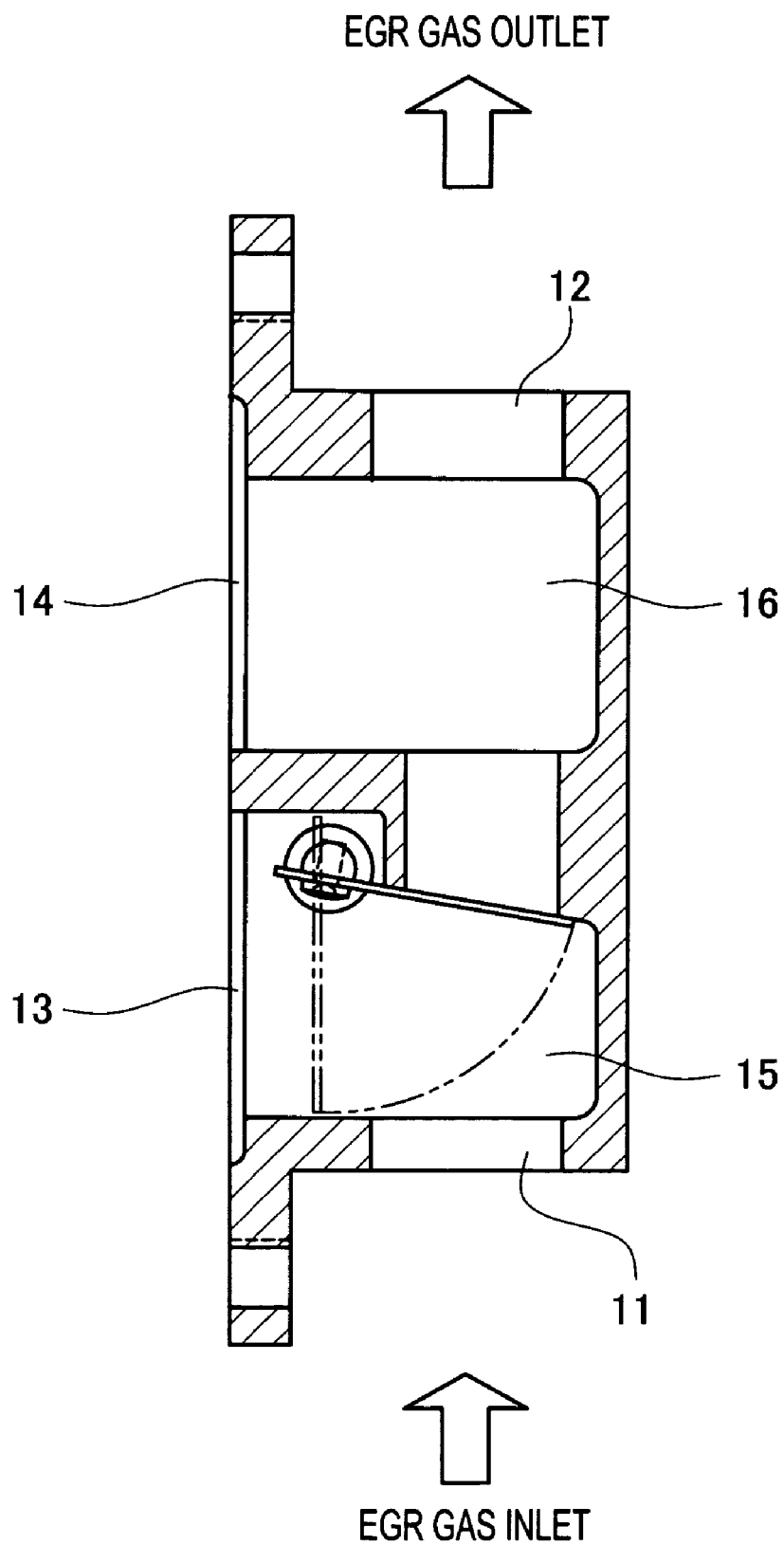
FIG. 9 is a view of another modified example in relation to a attaching vertical direction.

The above embodiment shows the case where the valve 1 is oriented so that the first passage 15 is on an upper side. Alternatively, the valve 1 may be oriented in an inverted position as shown in FIG. 9 so that the first passage 15 is on a lower side (the second passage 16 is on the upper side). It is to be noted that the flow passage switching valves shown in FIGS. 6 to 8 may similarly be inverted.

Figure 10:
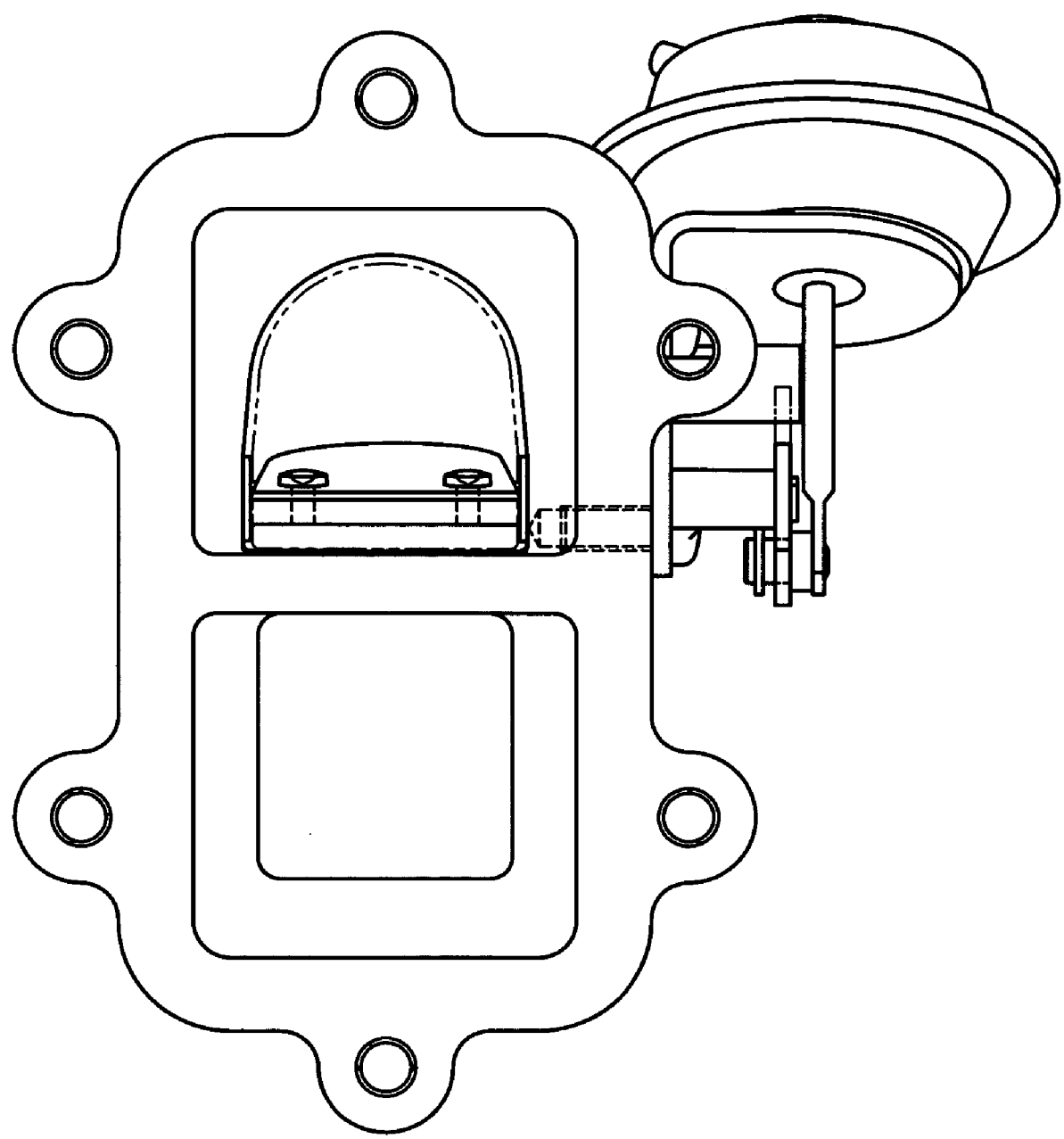
FIG. 10 is a view of another modified example in relation to shapes of a swing valve and a first flow passage.

In the above embodiment, the shape of the swing valve and the shape (in section) of the first passage are rectangle, but they may be configured in any shape; for example, semi-elliptic as shown in FIG. 10.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A flow passage switching valve comprising:
   a housing formed with an inlet port through which a fluid discharged from an engine flows in the housing and an outlet port through which the fluid flows out of the housing;
   a valve element of a swing arm type for allowing and interrupting communication between the inlet port and the outlet port to switch a flow passage;
   a valve shaft fixed to the swing arm type valve element;
   a bearing which rotatably supports the valve shaft;
   an actuator for rotating the valve shaft to swing the swing arm type valve element; and
   further comprising a thrust stopper for preventing movement of the valve shaft in a thrust direction;
   wherein the housing is formed with:
     a first passage communicated with the inlet port;
     a second passage communicated with the outlet port;
     a bypass passage which provides communication between the first passage and the second passage;
     an introduction port through which the fluid having flowed in the first passage is introduced into an external part attachable to the flow passage switching valve; and
     a discharge port through which the fluid introduced into the external part is discharged into the second passage.

2. A flow passage switching valve comprising:
   a housing formed with an inlet port through which a fluid discharged from an engine flows in the housing and an outlet port through which the fluid flows out of the housing;
   a valve element of a swing arm type for allowing and interrupting communication between the inlet port and the outlet port to switch a flow passage;
   a valve shaft fixed to the swing arm type valve element;
   a bearing which rotatably supports the valve shaft;
   an actuator for rotating the valve shaft to swing the swing arm type valve element;
   the valve element is placed in the first passage; and
   further comprising a thrust stopper for preventing movement of the valve shaft in a thrust direction;
   wherein the housing is formed with:
     a first passage communicated with the inlet port;
     a second passage communicated with the outlet port;
     a bypass passage which provides communication between the first passage and the second passage;
     the bypass passage is vertically formed;
     an introduction port through which the fluid having flowed in the first passage is introduced into an external part attachable to the flow passage switching valve; and
     a discharge port through which the fluid introduced into the external part is discharged into the second passage.

3. A flow passage switching valve comprising:
a housing formed with an inlet port through which a fluid discharged from an engine flows in the housing and an outlet port through which the fluid flows out of the housing;
a valve element of a swing arm type for allowing and interrupting communication between the inlet port and the outlet port to switch a flow passage;
a valve shaft fixed to the swing arm type valve element;
a bearing which rotatably supports the valve shaft;
an actuator for rotating the valve shaft to swing the swing arm type valve element; and
an attaching part and a fastening portion for attaching the external part to the flow passage switching valve so that a passage of the external part is connected with the introduction port and the discharge port;
wherein the housing is formed with:
   a first passage communicated with the inlet port;
   a second passage communicated with the outlet port;
   a bypass passage which provides communication between the first passage and the second passage;
   an introduction port through which the fluid having flowed in the first passage is introduced into an external part attachable to the flow passage switching valve; and
   a discharge port through which the fluid introduced into the external part is discharged into the second passage.

4. The flow passage switching valve according to claim 3, wherein the valve shaft is horizontally arranged.

5. The flow passage switching valve according to claim 3, wherein the fluid is EGR gas and the external part is an EGR cooler for cooling the EGR gas.

6. The flow passage switching valve according to claim 3, wherein the inlet port, the outlet port, and the bypass passage are linearly arranged.

7. A flow passage switching valve comprising:
a housing formed with an inlet port through which a fluid discharged from an engine flows in the housing and an outlet port through which the fluid flows out of the housing;
a valve element of a swing arm type for allowing and interrupting communication between the inlet port and the outlet port to switch a flow passage;
a valve shaft fixed to the swing arm type valve element;
a bearing which rotatably supports the valve shaft;
an actuator for rotating the valve shaft to swing the swing arm type valve element;
a valve seat is provided around an end of the bypass passage, with which the swing arm type valve element is to be brought into surface contact; and
the valve seat is formed at a slant with respect to a horizontal direction so that an operation angle of the valve element is less than 90°;
wherein the housing is formed with;
   a first passage communicated with the inlet port;
   a second passage communicated with the outlet port;
a bypass passage which provides communication between the first passage and the second passage;
   an introduction port through which the fluid having flowed in the first passage is introduced into an external part attachable to the flow passage switching valve; and
   a discharge port through which the fluid introduced into the external part is discharged into the second passage.

8. The flow passage switching valve according to claim 7, wherein the valve element is fixed to the valve shaft so that the valve shaft is positioned closer to a partition wall provided between the first passage and the second passage than the valve element when the bypass passage is closed, and an end of the valve element protrudes from the valve shaft to provide a slight clearance between the end of the valve element and the partition wall when the introduction port is closed.

9. The flow passage switching valve according to claim 7, wherein the partition wall provided between the first passage and the second passage has a slanting surface on the first passage side so that a thickness of the partition wall is reduced toward the introduction port.

10. A flow passage switching valve comprising:
a housing formed with an inlet port through which a fluid discharged from an engine flows in the housing and an outlet port through which the fluid flows out of the housing;
a valve element of a swing arm type for allowing and interrupting communication between the inlet port and the outlet port to switch a flow passage;
a valve shaft fixed to the swing arm type valve element;
a bearing which rotatably supports the valve shaft;
an actuator for rotating the valve shaft to swing the swing arm type valve element;
the valve element is placed in the first passage; and
the valve shaft is horizontally arranged;
wherein the housing is formed with:
   a first passage communicated with the inlet port;
   a second passage communicated with the outlet port;
   a bypass passage which provides communication between the first passage and the second passage;
   the bypass passage is vertically formed;
   an introduction port through which the fluid having flowed in the first passage is introduced into an external part attachable to the flow passage switching valve; and
   a discharge port through which the fluid introduced into the external part is discharged into the second passage.

11. The flow passage switching valve according to claim 10, wherein the fluid is EGR gas and the external part is an EGR cooler for cooling the EGR gas.

12. The flow passage switching valve according to claim 10, wherein the inlet port, the outlet port, and the bypass passage are linearly arranged.

13. A flow passage switching valve comprising:
a housing formed with an inlet port through which a fluid discharged from an engine flows in the housing and an outlet port through which the fluid flows out of the housing;
a valve element of a swing arm type for allowing and interrupting communication between the inlet port and the outlet port to switch a flow passage;
a valve shaft fixed to the swing arm type valve element;
a bearing which rotatably supports the valve shaft;
an actuator for rotating the valve shaft to swing the swing arm type valve element;
the valve element is placed in the first passage;
a valve seat is provided around an end of the bypass passage, with which the swing arm type valve element is to be brought into surface contact; and
the valve seat is formed at a slant with respect to a horizontal direction so that an operation angle of the valve element is less than 90°;

wherein the housing is formed with:
- a first passage communicated with the inlet port;
- a second passage communicated with the outlet port;
- a bypass passage which provides communication between the first passage and the second passage;
- the bypass passage is vertically formed;
- an introduction port through which the fluid having flowed in the first passage is introduced into an external part attachable to the flow passage switching valve; and
- a discharge port through which the fluid introduced into the external part is discharged into the second passage.

14. The flow passage switching valve according to claim 13, wherein the valve element is fixed to the valve shaft so that the valve shaft is positioned closer to a partition wall provided between the first passage and the second passage than the valve element when the bypass passage is closed, and an end of the valve element protrudes from the valve shaft to provide a slight clearance between the end of the valve element and the partition wall when the introduction port is closed.

15. The flow passage switching valve according to claim 13, wherein the partition wall provided between the first passage and the second passage has a slanting surface on the first passage side so that a thickness of the partition wall is reduced toward the introduction port.

* * * * *